United States Patent [19]
DeCamilli

[11] 4,215,561
[45] Aug. 5, 1980

[54] ADJUSTABLE END-OF-STROKE DEVICE FOR DIES FOR SHAPING THE WINDING HEADS OF ELECTRIC MOTOR STATORS

[75] Inventor: Franco DeCamilli, Varese, Italy

[73] Assignee: Sisme Societa Italiana Statori Motori Electric S.p.A., Italy

[21] Appl. No.: 894,155

[22] Filed: Apr. 6, 1978

[30] Foreign Application Priority Data

Apr. 18, 1977 [IT] Italy ............................... 21130/77[U]

[51] Int. Cl.² ........................................... B21D 37/14
[52] U.S. Cl. .......................................... 72/473; 72/413
[58] Field of Search .......................... 72/355, 473, 413; 83/529, 530

[56] References Cited

U.S. PATENT DOCUMENTS

| 56,337 | 7/1866 | Fleetwood | 72/473 |
|---|---|---|---|
| 306,010 | 9/1884 | Evans | 72/473 |
| 2,182,544 | 12/1939 | Merrian | 83/530 X |
| 2,374,852 | 5/1945 | Czapiewski | 72/473 |

*Primary Examiner*—Leon Gilden
*Attorney, Agent, or Firm*—Steinberg & Blake

[57] ABSTRACT

In a press means for shaping the heads of the stator winding of an electric motor by movable shaping die units, an adjustable end-of-stroke device comprising a rotatable cam having a plurality of steps selectably alignable with a stop member to adapt the stroke of said units to stators of different axial length.

1 Claim, 2 Drawing Figures

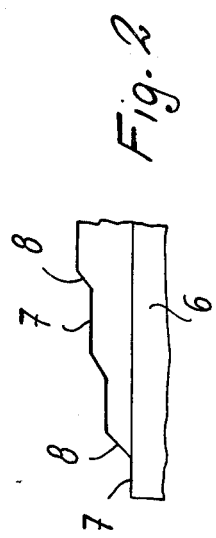
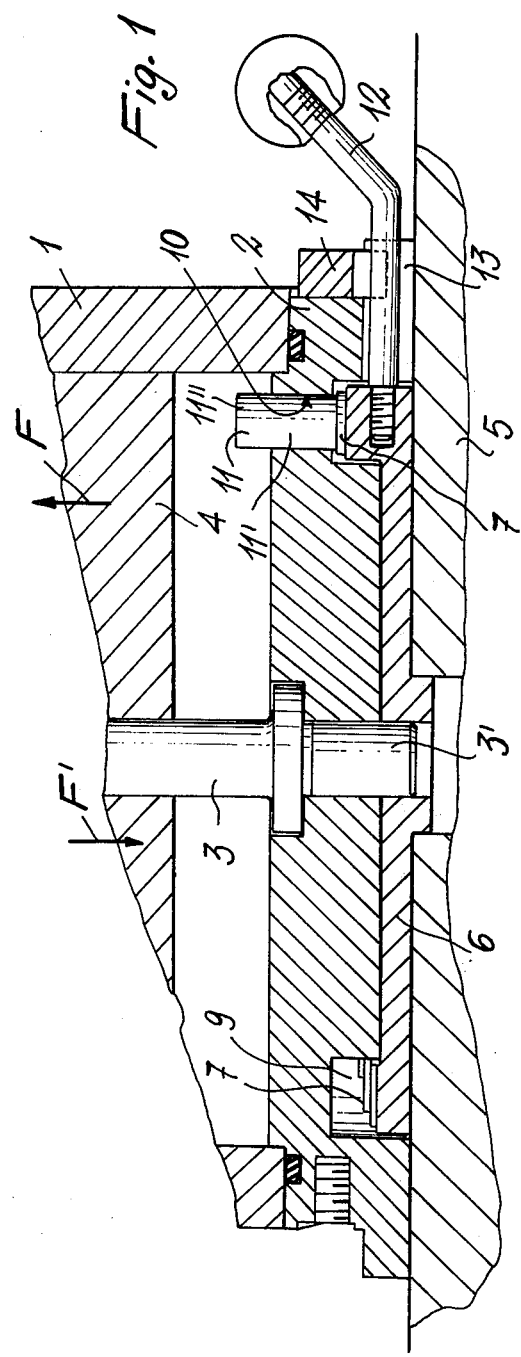

ADJUSTABLE END-OF-STROKE DEVICE FOR DIES FOR SHAPING THE WINDING HEADS OF ELECTRIC MOTOR STATORS

The present invention relates to an adjustable end-of-stroke device to be used in press means for shaping the winding heads of electric motor stators.

It is already known that the electric motor winding heads have to be properly shaped, after the mounting of the winding onto the stator, in order to allow the carrying out of further operations, such as—for example—the binding of the same winding heads, and others.

Press means are provided for such a shaping operation, and said press means comprises movable upper and lower dies, the upper die being provided with means for shaping the winding heads located on one side of the stator, and the lower die being provided with means for similarly shaping the winding heads located on the opposite side of the stator.

The stroke of the upper and lower dies towards each other depends on the axial length of the stator and, when the press has to be shifted from a given stator height to a different one, the stroke has to be accordingly modified.

Actually, the operation for modifying the stroke of the press means comprises the removal and substitution of those parts which act as stop members for the movable dies of the press. Such an operation, however, requires skilled labour and the need of stopping the production line.

The object of the present invention is to provide an adjustable end-of-stroke device for a press for shaping the winding heads of electric motor stators which embodies the advantages but avoides the drawbacks encountered with the conventional end-of-stroke means.

More particularly, the object of the invention is to provide an adjustable end-of-stroke device which allows to change the stroke of the upper and lower dies of a press in a very quick and safe manner, without the need of substituting parts of said press and of stopping the production line.

The adjustable end-of-stroke device, according to the invention, is used in press means comprising a movable die unit, and is characterized in that it comprises a disc shaped cam rotatably mounted around an axis, an arrangement of steps on one of the faces of said cam, and abutment means cooperating with a selected one of the steps for stopping the movement of said movable die unit.

The novel features which are considered as characteristics of the invention are set forth in particular in the appended claims. The adjustable end-of-stroke device itself, however, both as to its construction and its mode of operation, together with additional features and advantages thereof, will be understood upon perusal of the following detailed description of a preferred embodiment with reference to the accompanying drawing.

FIG. 1 is a sectional view of a press portion incorporating the end-of-stroke device according to the invention; and FIG. 2 is an enlarged side view of a particular not shown in FIG. 1.

Being the dies of the press specularly equal, hereinafter it will be described only the adjustable end-of-stroke device relating to the lower die, being intended that the claimed device is also applied to the upper die. The invented device can also be provided in presses wherein only one device is needed. Example of the presses are shown in coopending applications to the same applicant. For clearness sake, in the figure is shown only that portion of the press to which the claimed device is applied.

The press here shown substantially comprises a stationary cylinder 1, resting on a base plate 2 having a central and upwardly directed rod 3 along which a movable unit 4 is slidingly mounted, said plate 2 being secured to a bed 5 of the press.

Unit 4 carries a shaping die (not shown), for example of the type shown in co-pending appln. No. 891,167 filed on Mar. 28, 1978, and is movable in the direction of arrows F and F' by suitable hydraulic or pneumatic means, also not shown.

A circular face-type cam 6, rotatable about the end portion 3' of rod 3, is positioned underneath the base plate 2 and between said plate and the bed 5. Along the periphery of the active surface of cam 6 there is provided a plurality of increasing in height steps 7 interconnected by inclined planes or surfaces 8. Steps 7 are housed within a circular groove 9 machined on the undersurface of base plate 2.

On the base plate 2 there is provided a vertical passing through hole 10 guinding a movable pin 11 having a length greater than the thickness of said bed plate and which rests with its lower end 11' onto one of the steps 7 and with its upper end 11" protruding above the upper surface of plate 2. The upper end 11" acts as a stop member for unit 4.

A handle 12 protrudes sideways from cam 6, passing through an arcuate slot 13 machined along a side portion of base plate 2.

Suitable locking means 14 (in the form of a plate having a notch and fixed by screw to plate 2) locks the handle 12 in any desired position, and therefore locks the cam 6 in that position required for having the pin 11 protruding from plate 2 of that amount corresponding to the desired end-of-stroke position of movable unit 4.

In the operation, cam 6 is rotated by shifting the handle 12 along slot 13 until the pin 11 rests on the desired step 7, so as to protrude outside of the upper surface of plate 2 to stop the movable unit 4 at the desired height. Inclined planes 8 act as sliding surfaces for pin 11 during rotation of cam 6.

Pin 11, of course, can be secured to the undersurface of movable unit 4 in such a position to enter hole 10 and to act on one of the steps 7 brought in position under said hole. Similarly, the handle 10 can be substituted, for example, by a locking pin resiliently supported by the side contour of plate 6 and suitably controlled to engage one of a series of holes made on the side surface of base plate 2.

What I claim is:

1. In a press means for shaping the winding heads of electric motor stator by means of movable shaping die units, an adjustable end-of-stroke device comprising a disc shaped cam rotatably mounted around an axis, an arcuate arrangement of steps on one of the faces of said cam, and abutment means cooperating with a selected one of the steps for stopping the movement of at least one of said movable die units, said abutment means being a pin slidably mounted in a guiding hole of a stationary cover for said cam.

* * * * *